March 30, 1937.  J. M. PETREIKIS  2,075,464
COMBINATION AUTOMOBILE HEATER AND WINDSHIELD DEFROSTER
Filed June 11, 1936  2 Sheets-Sheet 1
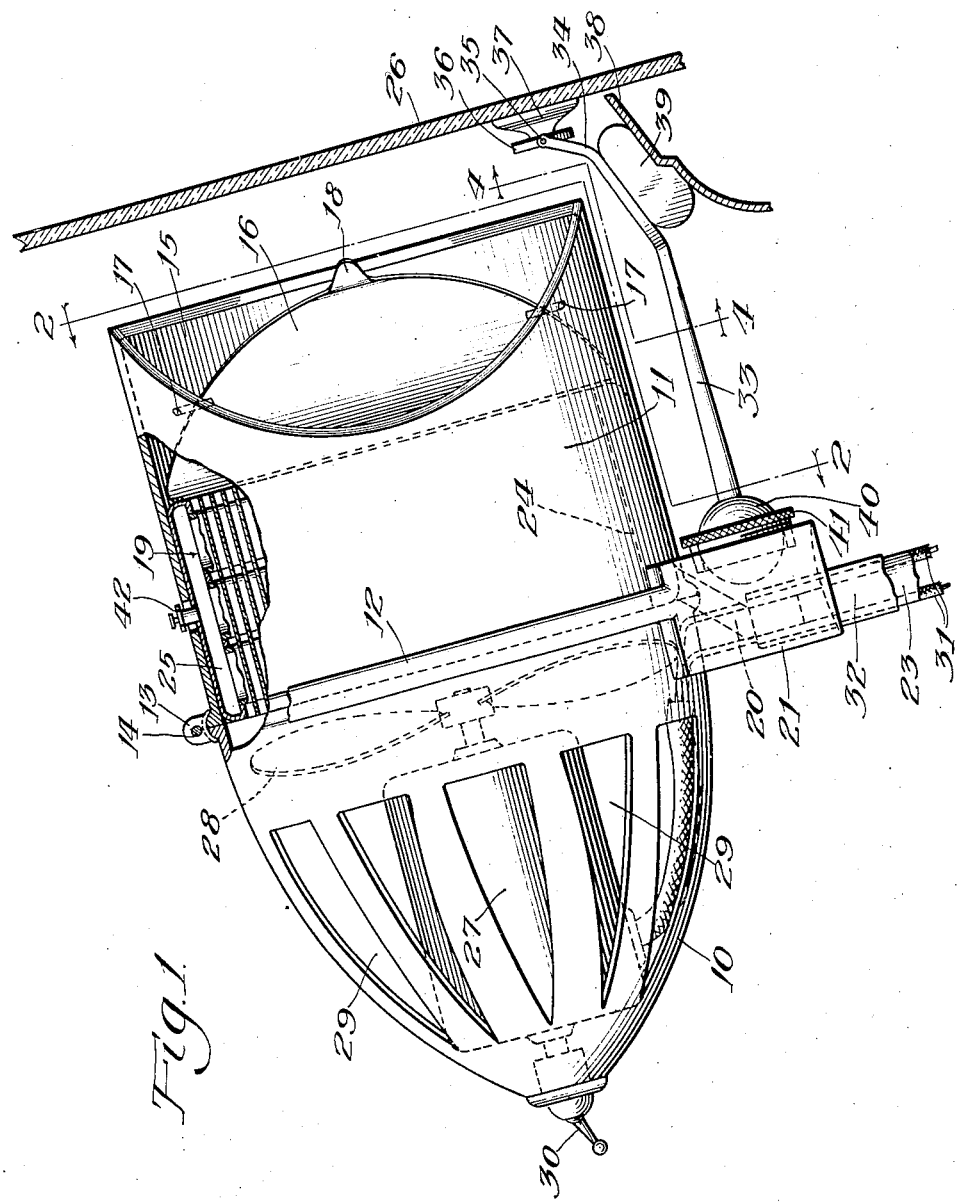

March 30, 1937. J. M. PETREIKIS 2,075,464
COMBINATION AUTOMOBILE HEATER AND WINDSHIELD DEFROSTER
Filed June 11, 1936 2 Sheets—Sheet 2
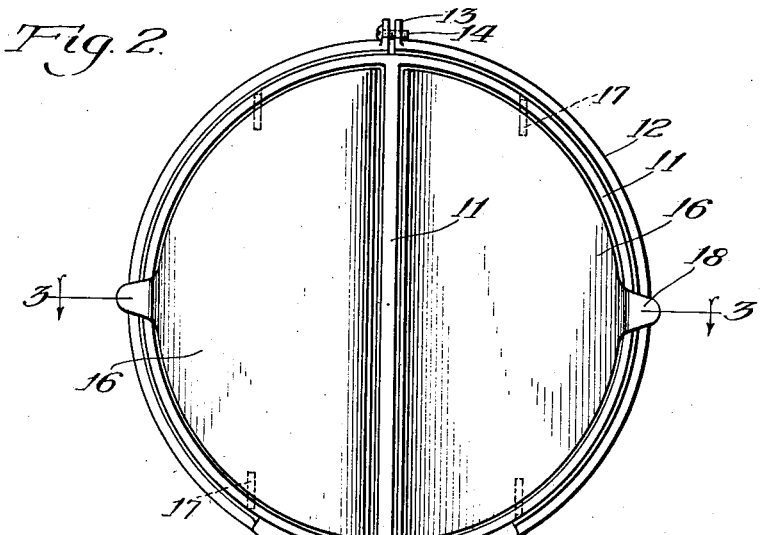
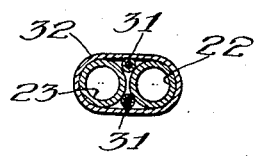
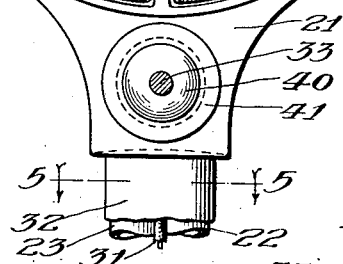
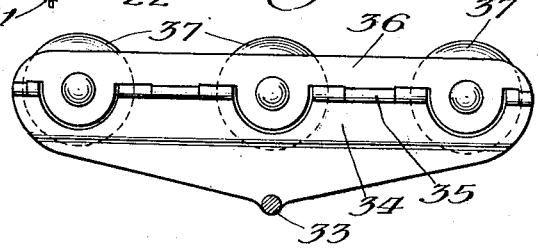
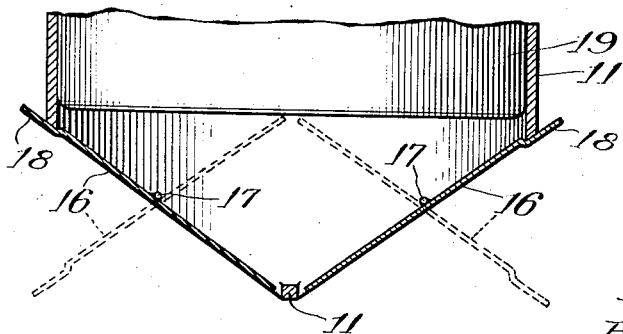
Inventor:
Joseph M. Petreikis,
By: Bertha L. MacGregor
Attorney:

Patented Mar. 30, 1937

2,075,464

UNITED STATES PATENT OFFICE 2,075,464

COMBINATION AUTOMOBILE HEATER AND WINDSHIELD DEFROSTER

Joseph M. Petreikis, Chicago, Ill.

Application June 11, 1936, Serial No. 84,620

5 Claims. (Cl. 257—137)

This invention relates to a combination automobile heater and windshield defroster.

One object of the present invention is to provide a portable device of the character described which may be conveniently mounted interiorly of the automobile and which will provide a simple and inexpensive means for heating the interior of the automobile and at the same time will serve as a defroster for maintaining the windshield free of snow, ice, sleet and the like.

Another object is to provide a small, compact device, efficient for its intended purposes, in which the heater housing and contained parts and the means for mounting the device on a fixed part of the automobile are self-contained and unitary and no separate fastening means are required for firmly but detachably mounting the heater in juxtaposition to the windshield of an automobile. The mounting means provide a self-adjusting connection between the heater and its support.

Another object is to provide novel means for assembling the parts constituting the heating unit and mounting means.

This application is a continuation in part of my application Serial No. 63,446 filed February 11, 1936.

In the drawings:

Fig. 1 is a side elevation showing the preferred embodiment of my invention.

Fig. 2 is an end view of the device, partly in section, as indicated by the line 2—2 of Fig. 1.

Fig. 3 is a sectional view taken on the line 3—3 of Fig. 2.

Fig. 4 is a sectional view taken on the line 4—4 of Fig. 1, particularly showing the mounting means.

Fig. 5 is a sectional view of a detail, taken on the line 5—5 of Fig. 2.

The preferred embodiment of the invention shown in the drawings comprises a casing or shell consisting of sections 10 and 11 adapted to fit together end to end. The sections may be of any suitable shape and design but they are preferably cylindrical, as shown, and are connected together by a clamping band or split ring 12 formed with ears 13 through which a screw or rivet 14 extends for holding the ring 12 in position.

The casing section 11 is substantially cylindrical and at its free end has openings 15 therein. The wall edges defining the openings 15 are beveled as shown to permit swinging movement of doors 16 hinged or pivoted as at 17. The doors 16 are substantially segmental in shape and are provided with handles 18 to facilitate swinging the door to adjusted position.

Within the casing section 11 is a heating unit 19 which is adapted to receive hot water from the cooling system of the internal combustion engine. The unit 19 comprises a series of conduits for circulation of the water, and air spaces between said conduits. The heating unit is provided with feed and return conduits which aline with passages 20 in a casting 21 integral with the ring 12. The feed and return passages 20 are connected with the cooling system of the internal combustion engine through feed and return conduits 22, 23, respectively. The water enters the heating unit through the feed conduit 22 at one side of a separation plate 24, passes upwardly to the chamber 25 and then downwardly and through the return conduit 23.

The heating unit 19 in the shell 11 permits a flow of air to be heated in its passage through the casing to the end that the heated air issuing through the openings 15 will be directed against the windshield 26 of the automobile for maintaining the same free of snow, ice or sleet. By properly angularly adjusting the doors 16 part of the heated air may be effectively used for raising the temperature of the interior of the automobile body.

Within the casing section 10 is an electric motor 27 provided with a fan 28 which draws air into the casing through air slots 29 in the section 10, to force the air through the casing and outwardly against the windshield 26 and into the interior of the car for the purpose stated. A switch 30 for the motor 27 is provided at the free end of the casing section 10.

Wires 31 for conveying current to the motor 27 are also passed through the casting or block 20 and, together with the conduits 22 and 23, are enclosed in a sheath 32, as best shown in Figs. 2 and 5.

The invention includes a novel attachment bracket for supporting the device in operative position within the automobile. Said attaching bracket comprises an arm 33 formed at one end with an angularly disposed plate-like bearing head 34 which has hinged thereto at 35 a bar 36 equipped with suction cups 37 adapted to be disposed against the inner face of the windshield 26 slightly above the inner cowl section 38 as clearly shown in Fig. 1.

A pad 39 is secured to the under side of the bearing plate 34. It rests on the inner cowl section 38 in the manner shown in Fig. 1 whereby the cowl section 38 serves to support the bracket and the pad 39 protects the cowl 38 against being marred or scratched by the bracket.

The bracket arm 33 is provided with a ball 40 which is retained by a ring 41 carried by the casting 21 to provide a universal connection between the casting 21 and the bracket arm 33. Thus the casing and associated parts may be swung to any angle relative to the arm 33 and be supported thereby at the desired angular adjustment productive of the results desired.

For the heating unit 19 there is provided a suitable vent 42 which extends through the casing 11 as shown.

When the device is in operation air will be drawn into the casing and in passage through the casing will be heated, hot water from the circulating system of the internal combustion engine being forced by the pump of said system to the heating unit 19 for heating the air passing through the casing. The heated air properly deflected by the adjusted doors 16 will impinge upon the windshield 26 to heat the same and thereby prevent snow, ice or the like accumulating thereon, and certain of the heated air will also be made use of for heating the interior of the automobile.

The self-adjusting means for quickly mounting and detaching the device as a whole is a valuable feature which permits making frequent changes in the position of the heater relatively to parts of the windshield to the end that said windshield may be kept clear and the heater be easily removed from a position adjacent the windshield when not required.

The relative positions of the suction cups 37 on the shield 26 and the bearing surface 34 on the cowl 38 govern the angle at which the arm 33 will be disposed.

Changes may be made in details of construction without departing from the scope of my invention and I do not intend to be limited to the exact form shown and described, except as set forth in the appended claims.

I claim:—

1. A heating device adapted to be mounted in an automobile, comprising a casing, a heating unit in the casing, a block depending from the casing, means extending through the block for connecting the heating unit with the cooling system of an automobile, a bracket for mounting the device on a fixed support, and means connecting the bracket to the block.

2. A heating device adapted to be mounted in an automobile, comprising a two piece casing, a band engaging abutting edges of the casing members to hold them in assembled relation, a block integral with the band, a heating unit in the casing, passageways in the block in communication with the heating unit in the casing, and means for mounting said casing on a fixed support.

3. A heating device adapted to be mounted in an automobile in juxtaposition to the windshield, comprising a casing, a heating unit in the casing, and a bracket secured to the casing and carrying means for mounting said device on a support without the aid of separate fastening means, said bracket comprising a rigid arm having a bearing member, a plate hingedly connected to said arm, and suction cups on the plate, the bearing portion of the arm being between said hinged plate and that end of the arm connected to the casing, whereby the bearing member may bear on a fixed support adjacent the windshield when the suction cups have been applied to the windshield.

4. A heating device adapted to be mounted in an automobile, comprising a casing, a heating unit in the casing, a block depending from the casing, means extending through the block for connecting the heating unit with the cooling system of an automobile, a bracket arm, a swivel joint between the bracket arm and the block, and means on the other end of the bracket arm for quickly and detachably connecting the arm to the windshield of an automobile and to bear on a fixed support adjacent said shield.

5. A heating device adapted to be mounted in an automobile, comprising a casing, a heating unit in the casing, a block depending from the casing, means extending through the block for connecting the heating unit with the cooling system of an automobile, a motor in the casing, electric current wires extending through said block and connecting the motor to a source of current, a sheath enclosing said wires and means for connecting the heating unit to the cooling system, and means for mounting the device on a fixed support.

JOSEPH M. PETREIKIS.